US012216050B2

United States Patent
Böhm

(10) Patent No.: US 12,216,050 B2
(45) Date of Patent: Feb. 4, 2025

(54) METHOD FOR CALIBRATING A THZ MEASURING APPARATUS, THZ MEASURING METHOD AND CORRESPONDING THZ MEASURING APPARATUS

(71) Applicant: CiTEX Holding GmbH, Melle (DE)

(72) Inventor: Roland Böhm, Altenberge (DE)

(73) Assignee: CiTEX Holding GmbH, Melle (DE)

( * ) Notice: Subject to any disclaimer, the term of this patent is extended or adjusted under 35 U.S.C. 154(b) by 468 days.

(21) Appl. No.: 17/602,578

(22) PCT Filed: Apr. 9, 2020

(86) PCT No.: PCT/DE2020/100292
§ 371 (c)(1),
(2) Date: Oct. 8, 2021

(87) PCT Pub. No.: WO2020/207540
PCT Pub. Date: Oct. 15, 2020

(65) Prior Publication Data
US 2022/0178677 A1      Jun. 9, 2022

(30) Foreign Application Priority Data
Apr. 9, 2019    (DE) .......................... 102019109339.2

(51) Int. Cl.
*G01B 11/02*      (2006.01)
*G01B 11/06*      (2006.01)
(Continued)

(52) U.S. Cl.
CPC ....... *G01N 21/3581* (2013.01); *G01B 11/028* (2013.01); *G01B 11/06* (2013.01);
(Continued)

(58) Field of Classification Search
CPC ......... G01B 11/00; G01B 11/02; G01B 11/06; G01B 11/105; G01B 11/026; G01B 11/028; G01N 21/3581
See application file for complete search history.

(56) References Cited

U.S. PATENT DOCUMENTS 10,514,336 B2 * 12/2019 Thiel ...................... G01B 11/24
10,584,957 B2 *  3/2020 Thiel .................. G01B 11/0691
(Continued)

FOREIGN PATENT DOCUMENTS

DE       102015122205           6/2017
DE       102015122205 A1        6/2017
(Continued)

OTHER PUBLICATIONS

An English translation of DE 10 2015 122205 A1 by Patent Translate (Year: 2023).*
(Continued)

*Primary Examiner* — Allen C. Ho
(74) *Attorney, Agent, or Firm* — Barnes & Thornburg LLP

(57) ABSTRACT

The invention relates to a method for calibrating a THz measuring apparatus (8), in particular a pipe, on a measurement object (10), comprising at least the following steps: providing a THz measuring apparatus (8) having a plurality of pivotable THz sensors (1), arranged in a circumferential direction around a measuring chamber (9), for outputting one THz transmitted beam (12) each along a sensor axis (B) (provision step); orienting the THz sensors (1) into a starting position in the measuring chamber (9) in which the measurement object (10) is received (orientation step in starting position); allocating the THz sensors (1) to at least one first and one second sensor group (group formation step); first calibration adjustment step, in which the second sensor group is adjusted as an adjustment group by means of the
(Continued)

Figure 1:
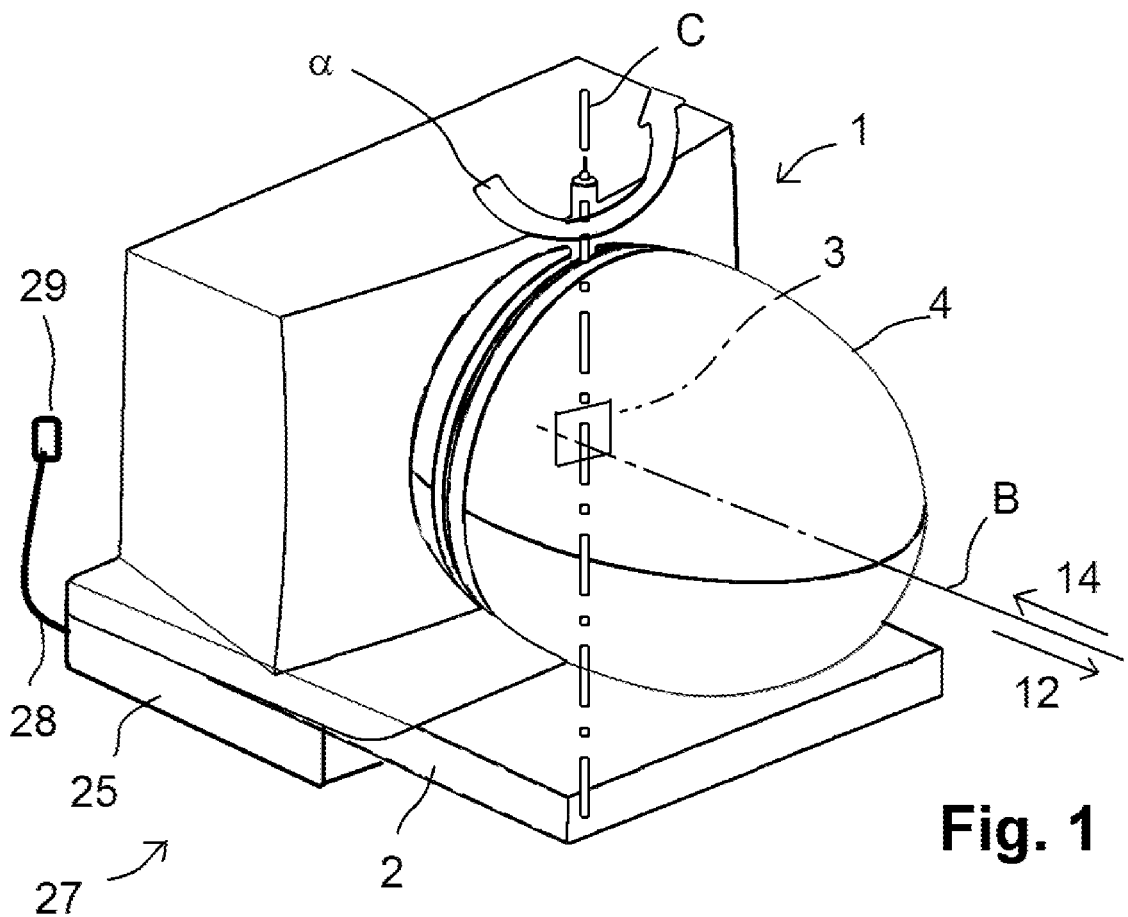

first sensor group as a starting group, and corresponding second calibration adjustment step, in which the first sensor group is adjusted as an adjustment group by means of the previously calibration-adjusted second sensor group as a starting group; wherein, in each of the calibration adjustment steps=by means of the THz sensors (S1, S3, S5, S7) of the starting group, spacing points on a surface (10a) of the measurement object (10) are determined, =sensor correction angles of the THz sensors (1; S2, S4, S6, S8) of the adjustment group are determined by means of the spacing points determined by the starting group, and =the THz sensors of the adjustment group are calibration-adjusted about the determined sensor correction angles (a).

20 Claims, 9 Drawing Sheets

(51) Int. Cl.
  G01B 11/10 (2006.01)
  G01B 11/12 (2006.01)
  G01B 15/02 (2006.01)
  G01N 21/3581 (2014.01)
(52) U.S. Cl.
  CPC ........ G01B 11/0691 (2013.01); G01B 11/105 (2013.01); G01B 11/12 (2013.01); G01B 15/02 (2013.01)

(56) References Cited

U.S. PATENT DOCUMENTS

| | | | | |
|---|---|---|---|---|
| 10,684,119 B2* | 6/2020 | Sikora | ................ | G01B 11/0625 |
| 10,753,727 B2* | 8/2020 | Klose | ................... | G01B 21/047 |
| 10,753,866 B2* | 8/2020 | Klose | ................ | G01N 21/3581 |
| 10,976,244 B2* | 4/2021 | Georgeson | ......... | G01N 21/3581 |
| 11,085,755 B2* | 8/2021 | Gregory | ............. | G01N 21/3581 |
| 11,143,590 B2* | 10/2021 | Hofeldt | ............. | G01N 21/3586 |
| 11,579,330 B2* | 2/2023 | Schneebeck | ....... | G01N 21/3581 |
| 11,874,105 B2* | 1/2024 | Klose | ................ | G01N 21/3581 |
| 11,988,499 B2* | 5/2024 | Böhm | ................ | G01N 21/3563 |

FOREIGN PATENT DOCUMENTS

| | | |
|---|---|---|
| DE | 102016111044 | 12/2017 |
| DE | 102016111044 A1 | 12/2017 |
| EP | 3480553 | 5/2019 |
| EP | 3480553 A1 | 5/2019 |
| JP | 2016166873 | 9/2016 |
| JP | 2016166873 A | 9/2016 |

OTHER PUBLICATIONS

International Search Report and Written Opinion for PCT/DE2020/100292 dated Jul. 7, 2020.
German Office Action for DE 102019109339.2.

* cited by examiner

US 12,216,050 B2

METHOD FOR CALIBRATING A THZ MEASURING APPARATUS, THZ MEASURING METHOD AND CORRESPONDING THZ MEASURING APPARATUS

CROSS REFERENCE TO RELATED APPLICATIONS

This application is a U.S. national stage application under 35 U.S.C. § 371 (b) of International Application No. PCT/DE2020/100292, filed Apr. 9, 2020, which claims priority to the German Patent Application No. 102019109339.2, filed on Apr. 9, 2019, the disclosures of both of which are hereby expressly incorporated by reference in their entirety.

THz measuring methods serve in particular for contactless measuring of measurement objects made of e.g. plastics or rubber that are being examined, following manufacture, for correct layer thicknesses and diameters. Hereby, e.g. extrusion products, in particular cylindrical bodies such as pipes, can be measured in their full circumference and contactless in that they are guided through a THz measuring apparatus having THz sensors arranged around a measuring chamber. The transmitted THz beams of the individual THz sensors are each partially reflected at the boundary surfaces of the layers so that the reflected THz beams reflected perpendicularly back towards the THz sensors can be detected making it possible to determine distances and layer thicknesses from a time of flight of the THz radiation. Hereby, different sensor principles are known, e.g. fully electronic as a dipole or with optical tools such as short pulse lasers, whereby the THz sensors may be designed, in particular, as THz transceivers for transmitting and detecting the THz radiation, and the measurements may be carried out as direct time of flight measurements, or even in frequency modulation, e.g. as FMCW radar THz sensors, or by means of pulsed radiation.

Ideally, the signal coupling is provided in a manner perpendicular to the measurement body's surface to be measured, so as to attain high feedback of the signal, also because e.g. only about 1 to 5% of the intensity is reflected back off the boundary surfaces making it possible to securely cover the outer and the inner boundary surfaces of the measurement body only in the case of perpendicular incidence. In particular in the case of grains having a curved surface like cylindrical bodies, e.g. pipes, errors in angle leading to the THz radiation being reflected sideways reducing the resulting signal amplitude up to a point of completely incorrect measurements. In particular in the case of taking measurements through wall thicknesses of the measurement object to be measured, even small misalignments boundary surface at each lead to undesired deflection of the measurement signal.

For measuring an extruded pipe e.g. a measuring chamber including four or more THz sensors may be provided which are arranged in a circumferential direction on a measuring receptacle (measurement table) and oriented radially towards the center of the measuring receptacle. Thus, when the measurement object is of circular cylindrical design and guided centrally through the measuring chamber, measurements can be carried out with high precision. In particular, however, extruded products are initially soft and deformable and are often guided through the measuring chamber out of place or non-centrically respectively.

Thus, the measuring receptacle or, respectively the measurement table serves, in particular, for receiving the THz sensors and may be designed, in particular, circular in shape.

In order to compensate for incorrect positioning of the measurement object in the measuring chamber mechanical adjustment means of the measurement object using the guiding device as well as mechanical adjustment means of the measuring apparatus relative to the measurement object are known. However, it is often only indirectly possible to exactly determine the incorrect positioning from the measurement signals because an in the measurement values may be attributed to both a change in the product and incorrect positioning of a flawless product, whereby, furthermore, a mechanical tracking of the measurement object is complex, also because the guiding devices must not exert forces that are too high on the still soft material of the measurement object. Thus, often, the entire THz measuring apparatus will be adjusted relative to the measurement object to which end motorized drives adjust e.g. 100 kg measuring plates, sensor systems, cables etc.

Moreover, the outer shapes of pipes often deviate from the round outer shape due to ovality and flattening, whereby such ovalities are sometime admissible and e.g. an ovality in the outer shape should not immediately lead to an error message but require a continued exact measuring of the layer thicknesses which, however, often case may not be possible any more due to the measuring apparatus'. Moreover, sensors with focusing systems and optical systems are often no longer correctly adjusted by the measuring receptacle which leads to non-perpendicular alignments and even inaccurate positions of the focus point.

The document DE 10 2015 122 205 A1 describes a method and a THz measuring apparatus for measuring a layer thickness and/or a distance, where at least one THz beam is irradiated from a THz transmitter and receiver unit onto a measurement object and THz radiation reflected from at least one layer is detected. Subsequently, the layer thickness can be determined from a difference in time of flight. Several measurements with differing optical axes are carried out, whereby the optical axis is adjusted during or in between the measurements, and one of the plurality of measurements is used to determine the layer thickness.

The citation DE 10 2016 111 044 A1 describes a THz measuring apparatus for measuring a test object using a time of flight measurement. Hereby, an active THz transmitter and receiver unit for emitting and detecting von THz radiation reflected on the test object is provided, whereby one or more passive THz receiver devices with their optical axes offset against the optical axis of the THz transmitter and receiver unit are provided and detect THz radiation reflected on the test object. Using the measurement signals and a synchronizing signal a second time of flight and a second distance of the measurement object from the at least one further THz receiver device can be determined.

Thus, it is the object of the invention to create a calibrating method for a THz measuring apparatus, a THz measuring method utilizing the calibrating method, as well as a THz measuring apparatus allowing for a secure calibration of the THz measuring apparatus with relatively little effort.

This task is solved by a calibrating method, a THz measuring method as well as a THz measuring apparatus according to the independent claims. Preferred further developments are described in the sub-claims.

The method for calibrating and the THz measuring method utilizing the calibrating method according to the invention may be carried out, in particular, using the THz measuring apparatus according to the invention.

Thus, the THz sensors are incorporated in the THz measuring receptacle, in a manner that it adjustable, in particular pivoting, and can be adjusted upon calibration to a measurement object guided through the measuring apparatus.

Hereby, the THz sensors are arranged, in particular, on a circular circumferential line of the measuring receptacle and can be swiveled individually and independent of one another. Thus, each THz sensor can be pivoted on its own so as to adjust the THz measuring apparatus to the measurement object. Preferably, the swivel axis of the THz sensors lies within the circular circumferential line and extends perpendicular to a measuring plane defined by this circumferential line, and/or the swivel axes each extend parallel to a symmetry axis or, respectively, transport direction of the measurement object.

The THz sensors are arranged, in particular, in a measuring plane, with their sensor axes running within the measuring plane, and their swivel axes each being oriented perpendicular on the measuring plane, for adjustment in the measuring plane, preferably without further translational or rotating adjustability.

The measuring plane may, in particular, be defined by the plurality of THz sensors and the measuring receptacle, i.e., in particular, all THz sensors can pivot within the same measuring plane.

In principle, however, the rotation point or, respectively, the swivel axis of the THz sensor may lie slightly outside the exact circle circumference line, in particular, if the coordinates of the swivel axis relative to the measuring apparatus or, respectively, in the measuring plane are subsequently taken into consideration.

Thus, advantageously, it is provided to neither make a translatoric adjustment of the entire measuring receptacle, e.g. in XY coordinates in the measuring plane, nor, advantageously, to retrace the measurement object accordingly in the measuring plane in order to center it, but to swivel the THz sensors individually in their sensor receptacle so as to attain the best placement and positioning. In particular, this aims at aligning the sensor axes of all THz sensors perpendicular, in total or partly, to a face of the measurement object, in particular, to the surface.

Such an adjustment of the individual sensor axes can be carried out irrespective of whether the pipe is shaped ideally round or e.g. oval or provided with flat areas. Thus, in particular, deformations like e.g. ovalities and flat areas of the measurement object, which are sometimes permitted and require further measuring, do not cause an immediate abortion of the measurement but, rather, can be securely detected and measured by measurement signals that are adjusted to be perpendicular.

A further advantage of the invention is that an individual adjustment, in particular pivoting, of the THz sensors can be carried out faster and safer than a translational adjustment of the entire measuring receptacle. Hereby, the masses to be adjusted are smaller so that, among other things, vibrations etc. can be kept at a minimum. Individual swiveling of the THz sensors can be carried out quickly and accurately without having to make a translational adjustment of the entire measuring receptacle or the entire measuring apparatus respectively.

Hereby, in principle, it is sufficient to provide one single degree of freedom, i.e. in particular rotation about the sensor-swivel axis extending perpendicular to the measuring plane or, respectively, parallel to the axis of symmetry, again allowing for a simple technical implementation and quick adjustment. The individual adjustment of the sensors can be carried out partly in parallel allowing for a quick adjustment of all THz sensors of the THz measuring apparatus.

The THz sensors may be designed optically or preferably fully electronically, carrying out measurements or, respectively, distance measurements as directed time of flight measurements of the run-time of the emitted transmitted THz beam and the bounced-back reflected THz beam, or even measurements using frequency modulation, e.g. as FMCW radar THz measuring method; furthermore, corresponding measurements using pulsed THz radiation are feasible. The frequency band of the transmitted THz beams may be in the range of Terahertz radar and microwave radiation, in particular between e.g. 5 GHz and 50 THz, e.g. 10 or 30 GHz to 5 or 10 THZ, in particular 300 GHz to 3 THz.

Hereby, the THz sensors emit the transmitted THz beam, in particular, in the frequency band of 5 THz to 50 THz, the lower frequency value being e.g. 5, 10, 30 or 300 GHz, and the upper frequency value being 3, 5, 10 or 50 THz.

According to the invention, it is also possible to use THz sensors with sensor optical units, for example, focused lenses made e.g. of plastics or silicon, before the THz chips. Advantageous are, in particular, embodiments with fully electronic THz sensors, i.e. in particular as THz chip with e.g. a THz optical unit or converging lens respectively placed before it, because this enables a small lead to be adjusted or, respectively, inertia moment to be adjusted so that fully electronic THz sensors make an ideal combination with the pivoting adjustment mechanism.

The calibrating method is carried out, in particular, by a controller means of the THz measuring apparatus which may be implemented centrally and collects and evaluates the measuring signals or, respectively, signal amplitudes of the sensors, or which may also be implemented as peripheral controller means in the sensors together with e.g. a central controller unit.

The THz measuring method for measuring a measurement object according to the invention advantageously provides that the measurement object is continuously guided along a transport direction, in particular along its central axis and/or the axis of symmetry of the THz measuring apparatus, through the THz measuring apparatus, in particular orthogonal in relation to the measuring plane, so as to measure the measurement object continuously and across its entire circumference.

According to a preferred embodiment, the THz sensors are divided into two sensor groups which are adjusted successively. The sub-division of the sensors may be made, in particular, alternatingly in the circumferential direction, so each sensor of one group is each provided between two sensors of the other group. Hereby, e.g. the first sensor group initially forms a starting group while the second sensor group forms an adjustment group, and subsequently vice versa. Hereby, the idea is to enable the adjustment of a sensor of the adjustment group, i.e. initially the second group, by the two adjacent sensors of the starting group, i.e. initially the first group, thereby to firstly adjust the sensors of the adjustment group; thereafter, it is then possible again to similarly adjust the sensors of the first sensor group depending on the sensors of the second sensor group.

According to a preferred embodiment, the symmetrical and central alignment of all THz sensors, i.e. radial in relation to the axis of symmetry or, respectively, center of the measuring chamber, is chosen as the starting position. Such an embodiment allows, in particular, also a quick adjustability from a standardized position and independently from the current position of the measurement object.

Then, in a first subsequent measuring step, the THz sensors of the first sensor group determine the distances from the exterior surface of the measurement object, thereby determining vectors or, respectively, positions of spacing points of the exterior surface which, thus, correspond with the intersection point of the sensor axis with the exterior surface of the measurement object. Thus, this step can be carried out initially quickly and without any mechanical adjustment of the THz sensors. Subsequently, the so determined spacing points can be utilized to determine an angular correction of the THz sensors of the second sensor group in that always two successive THz sensors of the first sensor group, i.e. e.g. in circumferential direction the first and third THz sensor of the sensor arrangement, determine an angular correction of the THz sensors of the second sensor group lying in-between them. Thus, the angular corrections of all THz sensors of the second sensor group can be determined at the same time or, respectively, in parallel. From this determination alone it is possible to derive an angular correction of the THz sensors of the second sensor group mathematically with little computational effort, and, thereby, to subsequently correct the THz sensors of the second sensor group accordingly by a relatively small swiveling motion.

Then, subsequently, what follows is the corresponding correction or compensation respectively of the THz sensors of the first sensor group on the basis of the corrected or, respectively, compensated THz sensors of the second sensor group, in that again the angular corrections are determined individually and the sensors of the first sensor group are adjusted.

This procedure can subsequently be repeated iteratively so as to achieve adjustments of ever higher precision; then, in addition or in the alternative, it is also possible, however, to swivel the individual THz sensors about their previously adjusted position in both directions about small adjustment angles in a fine adjustment process, so as to determine the largest signal amplitude by comparison of the measurements, which can then be utilized as proof of a precise alignment along the vertical, because the signal amplitude of the reflected THz reflection beams is at its maximum when the alignment is exactly perpendicular. Hereby, one or more suitable adjustment angles in both directions may be made; generally, however, one adjustment angle in each direction will be sufficient for the fine adjustment.

By virtue of the first calibration with the alternating determination of the sensor groups for compensating the THz sensor of the other group respectively lying in-between alone it is possible to carry out the coarse pre-adjustment which will be even sufficient, in particular, in the case of pipes having an essentially cylindrical shape. Thus, for example, an adjustment solely on the basis of the principle of maximum value determination would require significantly longer adjustment times in case of larger deviations than on the basis of the adjustment step with alternating sensor groups and mathematical correction.

Thus, a quick and secure calibration can be carried out with little technical effort allowing for a THz measuring method with high precision measuring of distances and layer thicknesses of a measurement object, e.g. a pipe profile. Thus, it is possible to guide the measurement object progressively and continuously through the measuring plane of the measuring apparatus and measure the entire circumference thereof because possible corrections can be quickly carried out by the sensors individually, allowing for an individual adaptation to the situational condition of the pipe surface.

Thus, the calibration according to the invention complements, in a particular manner, the continuous THz measuring of layer thicknesses of a measurement object guided perpendicularly through the measuring plane.

The individual swiveling of the THz sensors can be carried out quickly and by means of small scale pivoting devices because the pivoting angles to be adjusted are small. Thus, it is possible to use micro motors for sensor adjustment capable of adapting the correction angles quickly with little mass and energy consumption and finely adjustable. The individual swiveling of the THz sensors enables the use of unguided drive systems having just a few grams of thrust power.

Preferably, each sensor itself is mounted on a sensor receptacle or console respectively and electrically connected to a mounting plate e.g. via a plug connection. Thus, in the event that a THz sensor should fail, a sensor module consisting of sensor with adjustment means can be replaced quickly and safely without having to shut down and repair the entire measuring apparatus.

The failure of one axis, i.e. in particular of a THz sensor, does not stop the other THz sensors from continuing to operate. Even if, due to the failure of one sensor, e.g. the compensation of the neighboring sensor of the other sensor group should be rendered entirely impossible, it may be possible to compensate this sensor by the individual swiveling and comparison of the sensor amplitudes according to the method of fine adjustment. However, as a matter of principle, the loss of one THz sensor will not prevent the entire measurement of the measuring system.

Moreover, the required installation space of the measuring apparatus is reduced because the considerable travels of a translational adjustment of the entire measuring receptacle is no longer provided. This also significantly reduces the package. Also, large, complex cable tracks for the measuring apparatus can be omitted.

While the mathematical-geometrical determinations provided according to the invention are essentially approximations of ideal positions, it is recognized, however, this already allows for a quite accurate and quick alignment with little effort and this saving of time in turn increases the accuracy in the case of continuous measuring.

Figures 2, 3:
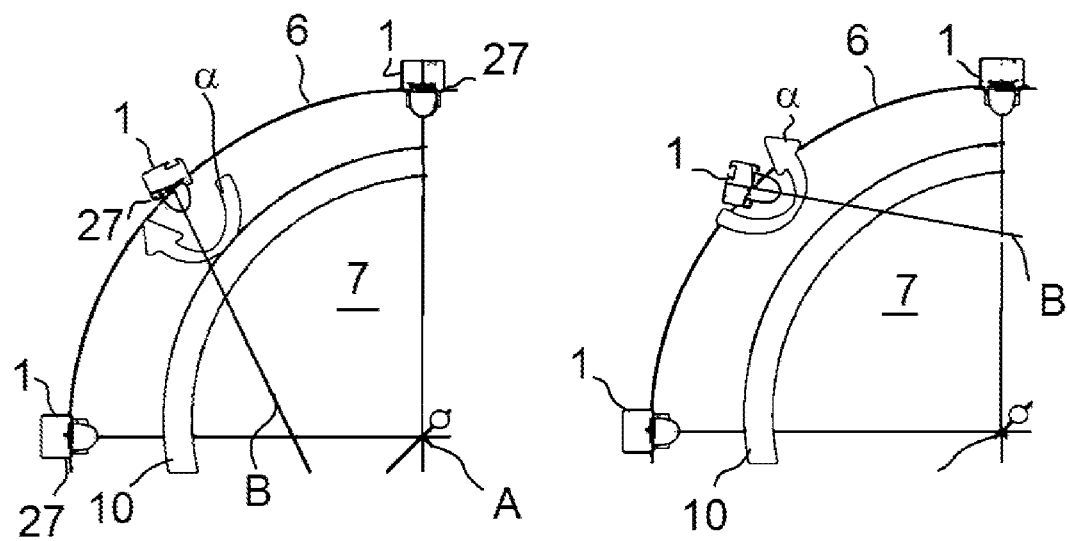
Figure 4:
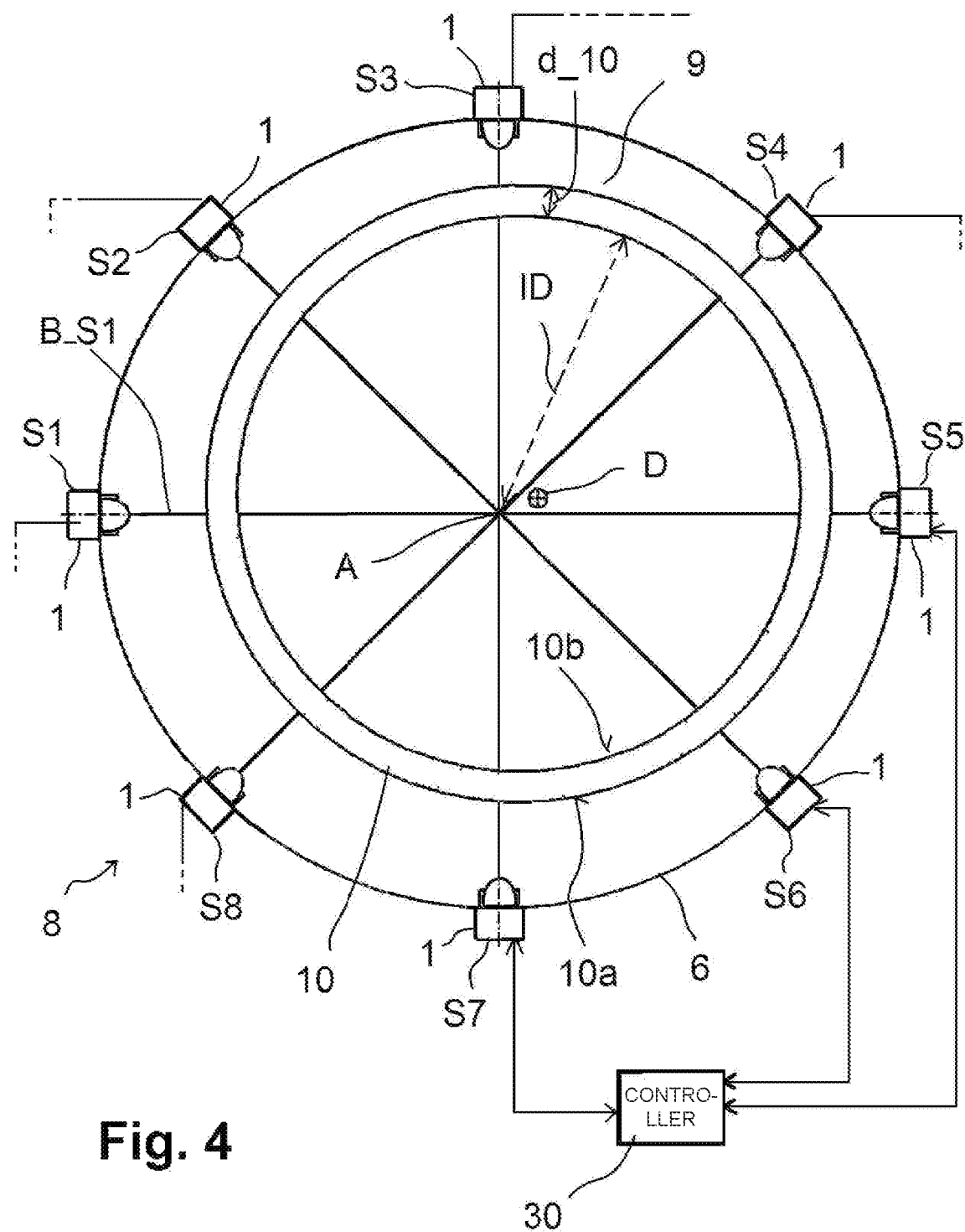
Figure 5:
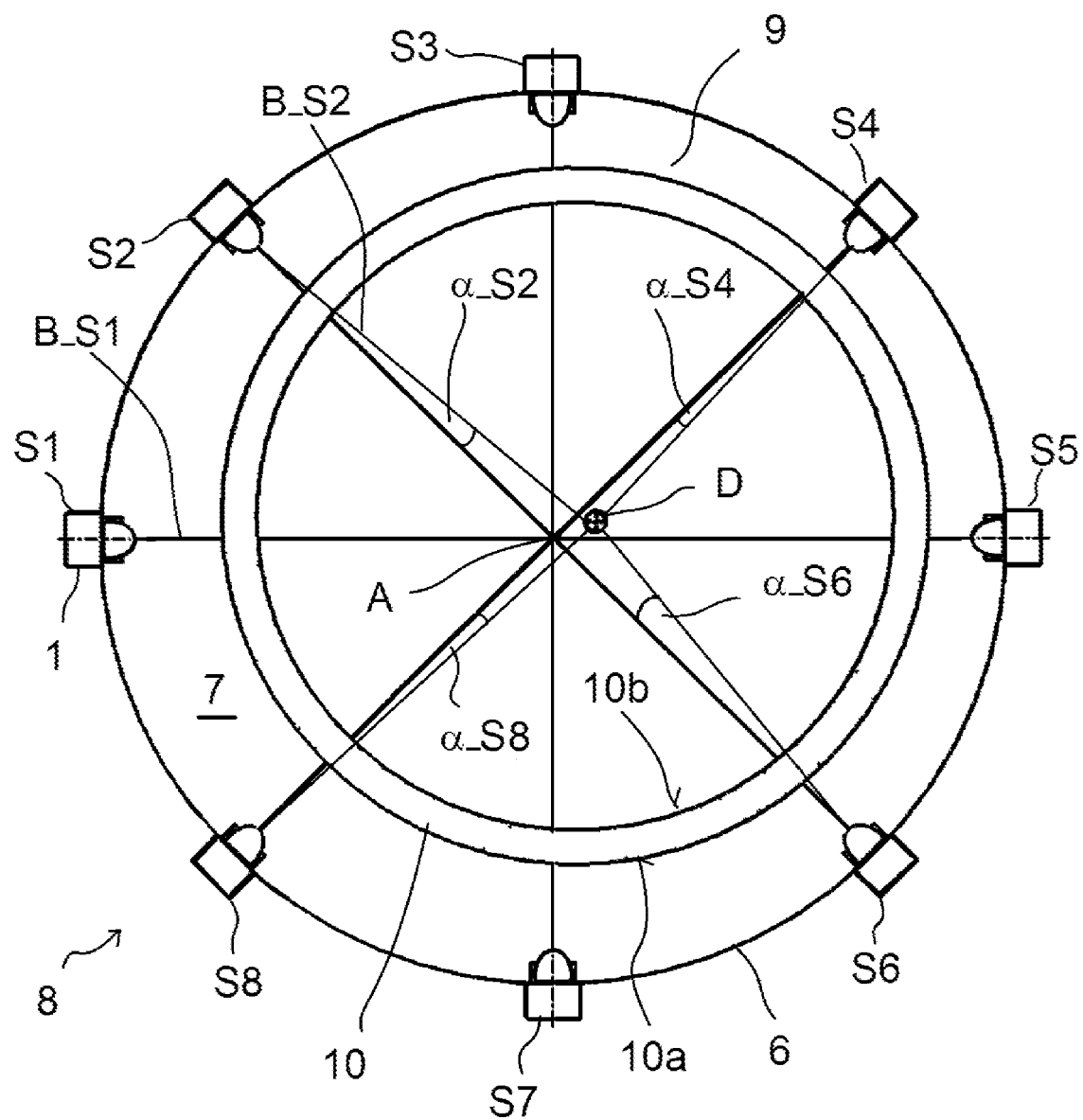
Figure 6:
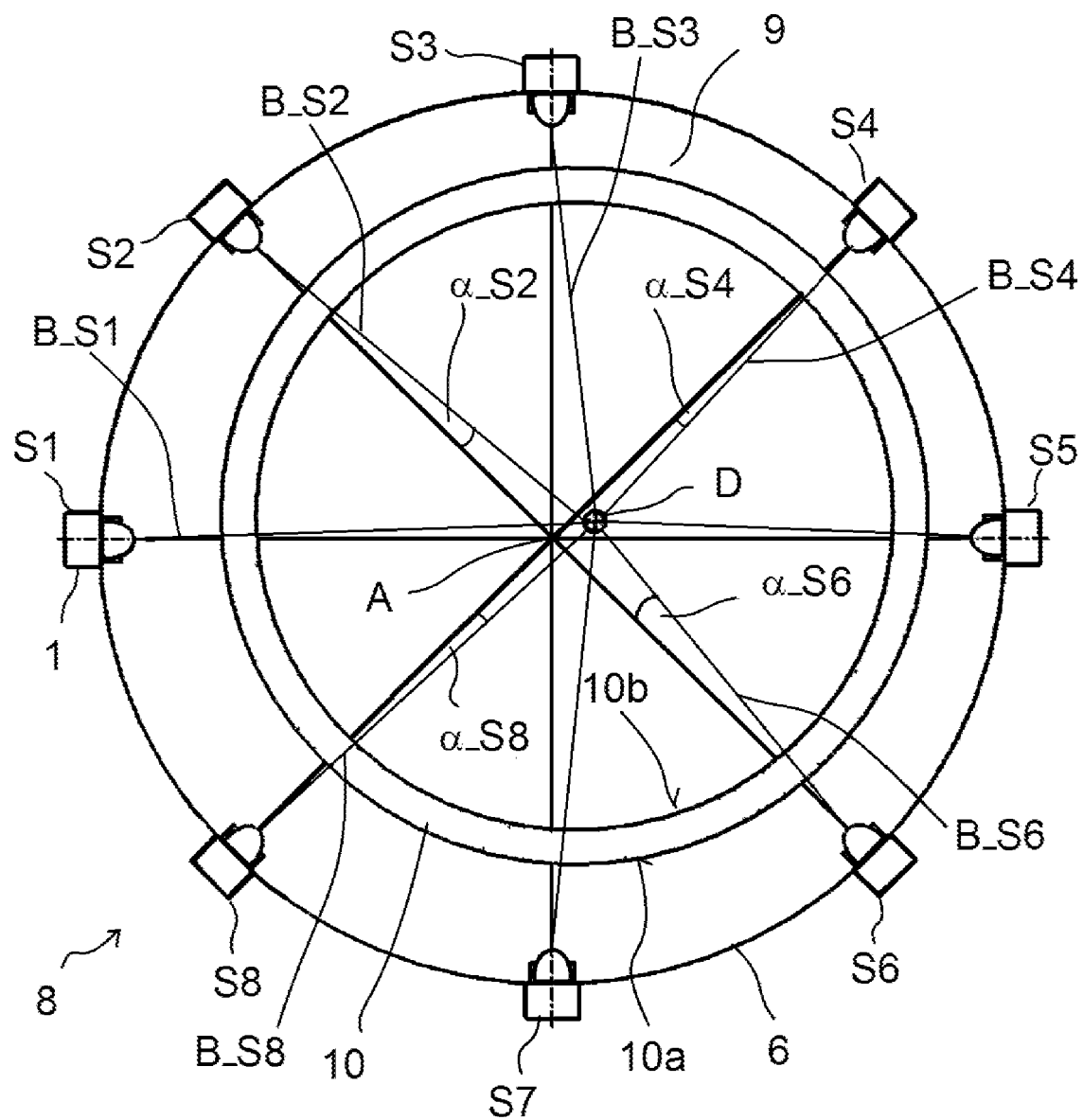
Figure 7:
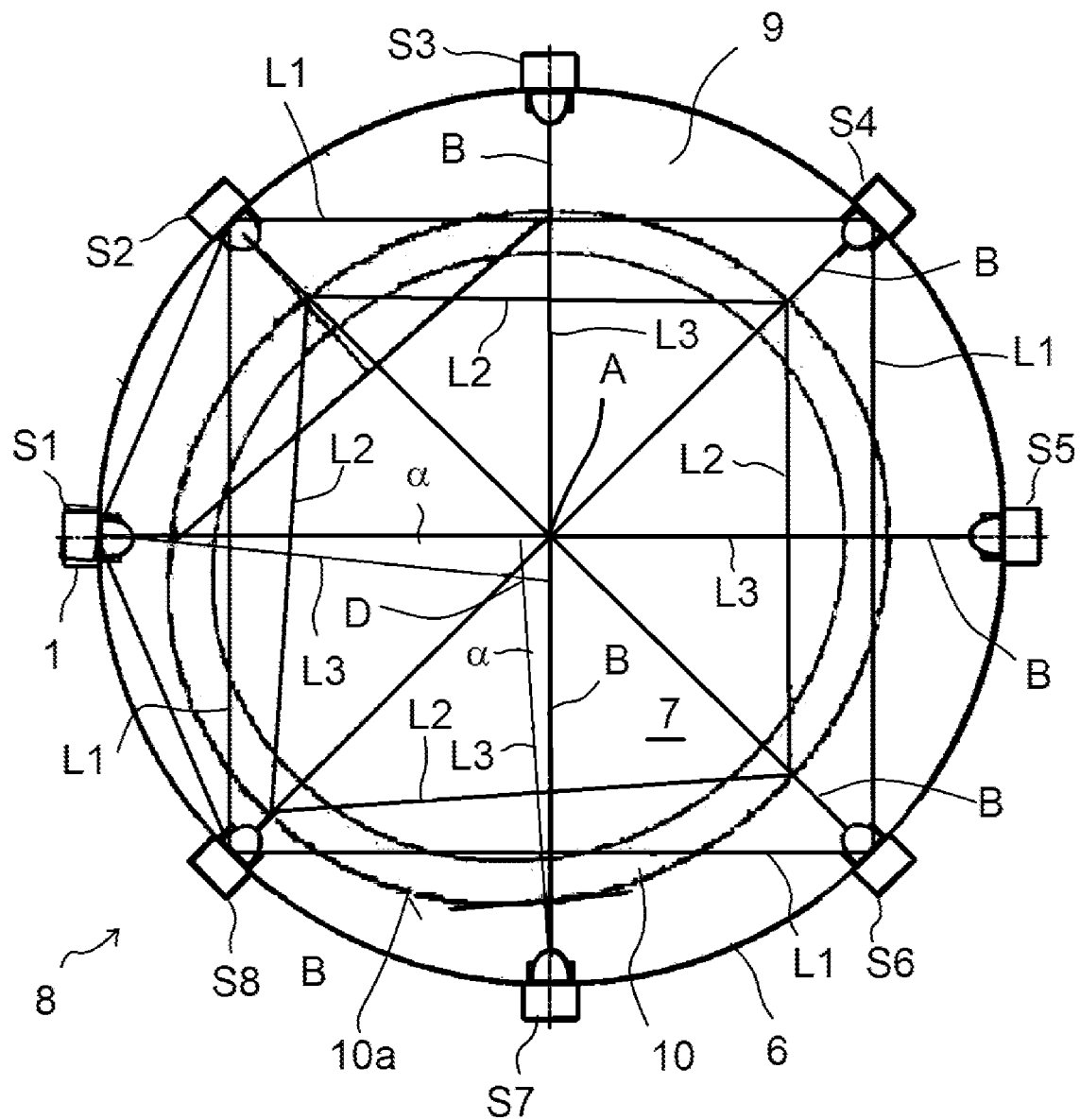
Figure 7:
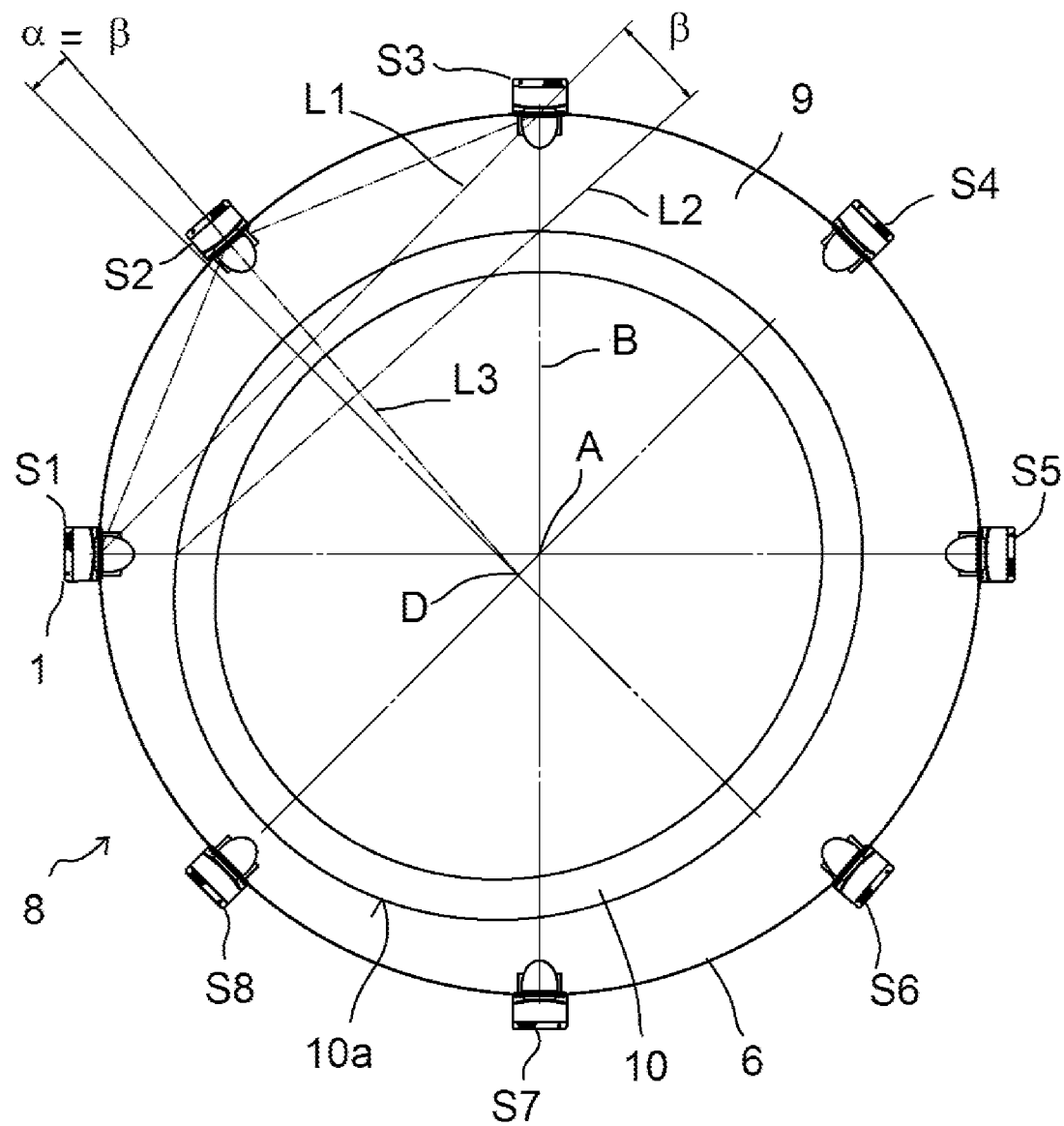
Figure 8:
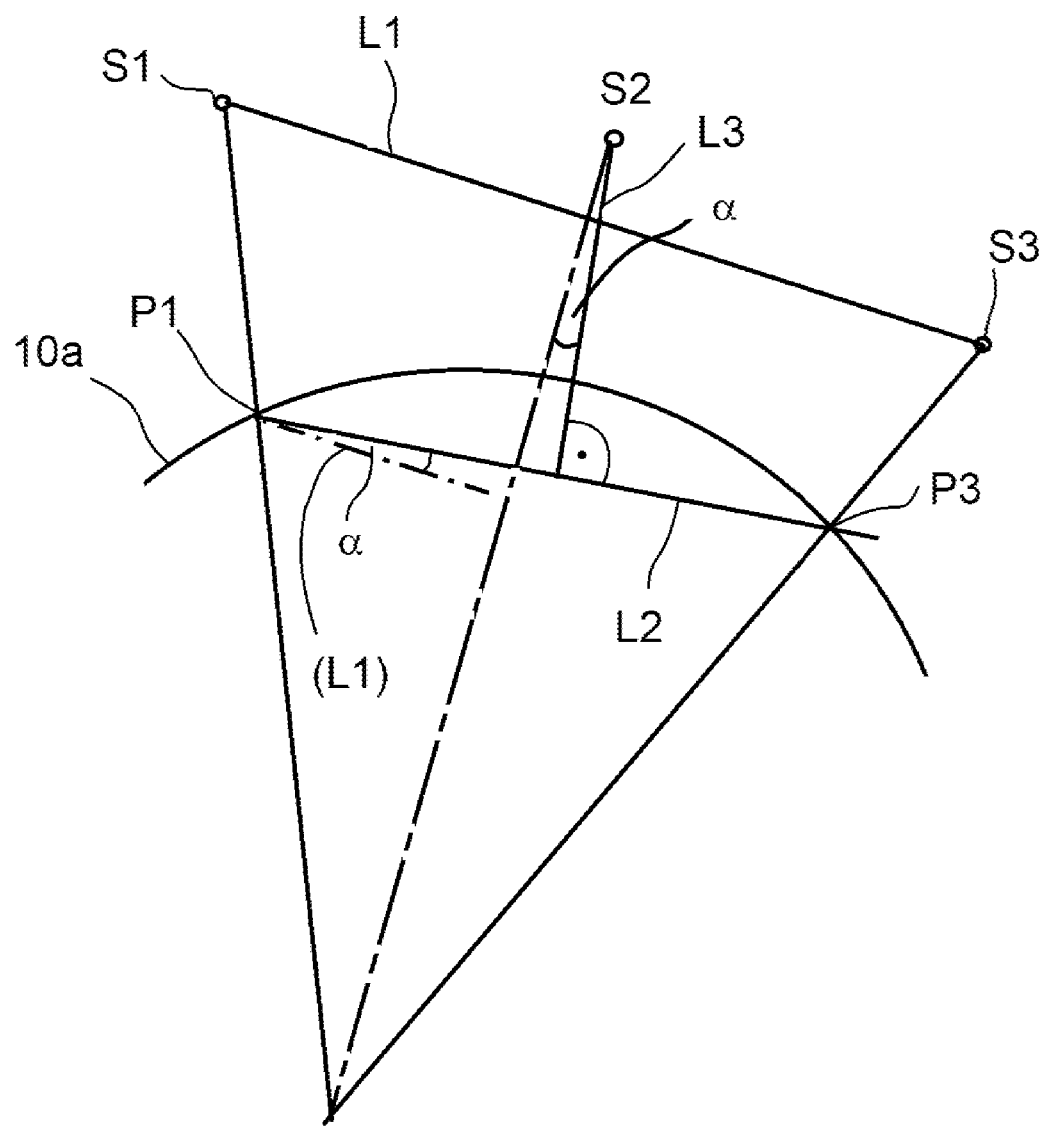
Figure 9:
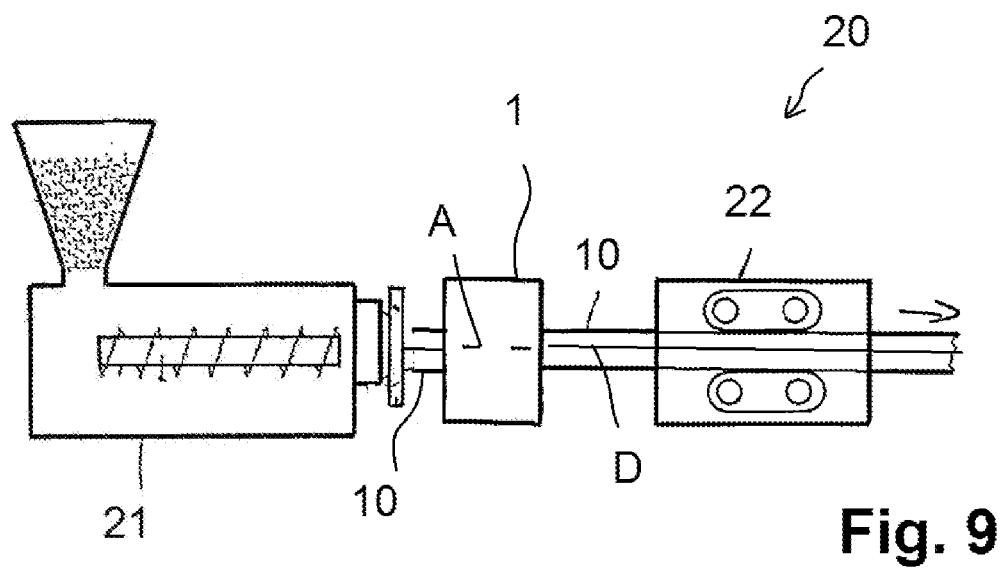
Figure 10:
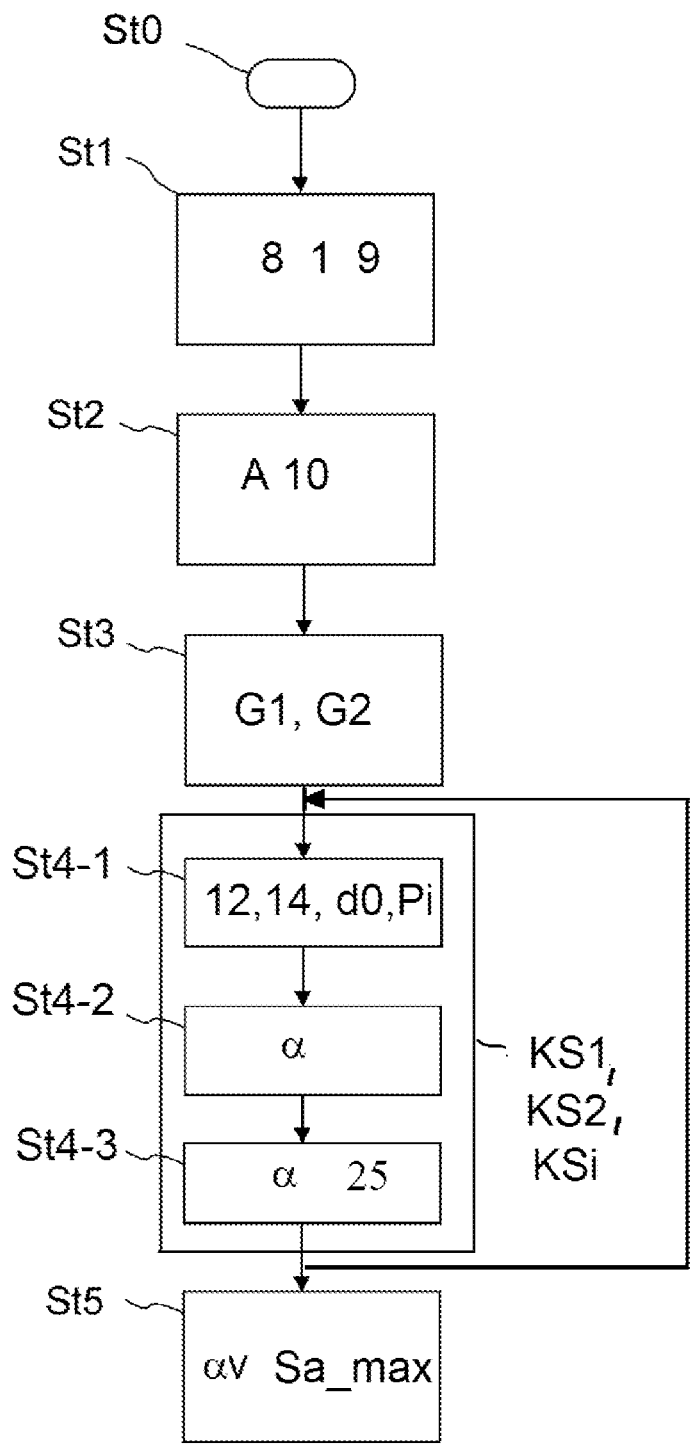

The invention will be further illustrated below by means of the accompanying drawings by means of a few embodiments. Therein is shown:

FIG. 1 a THz sensor of a THz measuring apparatus according to an embodiment of the invention, in a swiveling receptacle;

FIG. 2 an arrangement of THz sensors on a sensor receptacle with a first pivoting position of a THz sensor;

FIG. 3 the representation from FIG. 2 with a further pivoting position of the THz sensor;

FIG. 4 a THz measuring apparatus according to an embodiment of the invention with a pipe received as the measurement object profiled through the axis of symmetry in its starting position;

FIG. 5 a procedure step following that of FIG. 4 with determination of sensor correction angles of the second sensor group depending on distance measurements of the first sensor group;

FIG. 6 a procedure step following that of FIG. 5 with determination of sensor correction angles of the first sensor group depending on distance measurements of the second sensor group;

FIG. 7 a) and b) the measuring of an oval pipe as the measurement object in the starting position;

FIG. 8 a graphical representation of an evaluation pattern for determining an angular position correction;

FIG. 9 a lateral view of an arrangement for manufacturing a pipe including a THz measuring apparatus;

FIG. 10 a flow chart of a method according to an embodiment of the invention.

FIG. 1 shows a THz sensor 1 in a sensor receptacle 2. The THz sensor 1 may, in particular, be designed fully electronical, i.e. in particular as a dipole, with a THz chip 3 that emits THz radiation focused by a THz lens 4 so that the THz sensor 1 emits a transmitted THz beam 12 along a sensor axis B. The THz sensor 1 is received in the sensor receptacle 2 in a swivel axis C, extending, in particular, perpendicular through the sensor axis B, pivoting about a sensor correction angle α.

FIGS. 2 and 3 show the arrangement of a plurality of THz sensors 1 on a measuring receptacle 6, designed, in particular, circular in shape, where FIGS. 2 and 3 show different sensor correction angles α of the middle THz sensor 1. Thus, the THz sensor 1 is pivoting in a measuring plane 7 defined by the plurality of THz sensors 1 and the measuring receptacle 6, i.e. in particular, all THz sensors 1 pivot in the same measuring plane 7, as will be further explained in the following.

Hereby, a sensor module 27 is formed by sensor 1, sensor receptacle 2, an adjustment device 25 which may be, in particular, an electrical micro motor and serves to swivel the sensor 1 in the sensor receptacle 2, as well as a wire 28 and a plug 29 via which the sensor modules 27 are each replaceable received in the measuring receptacle 6 and, in the event of failure, can be replaced separately, even during operation. The plurality of THz sensors 1 put out their measurement signals as signal amplitudes Sa via the wired 28 to the central controller means 30, the controller means 30 in turn controlling the sensor modules 27 for adjusting the adjustment devices 25 so as to set individual sensor correction angles α.

FIG. 4 shows a THz measuring apparatus 8 as a top view on the measuring plane 7. The plurality of THz sensors 1, eight THz sensors 1 according to this embodiment, are each directed in their sensor axis B onto an axis of symmetry A which is formed centrally in the measuring chamber 9 defined between the THz sensors 1, i.e. in particular, in the geometric center of the circular measuring receptacle 6. Thus, the axis of symmetry A extends perpendicular through the measuring plane 7; thus, in particular, the swivel axes C each extend in parallel to the axis of symmetry A.

In the measuring chamber 9 a measurement object 10 is received, in this case a single-wall plastic pipe 10, according to the embodiment shown here having an ideal cylindrical shape, i.e. having a cylindrical exterior surface 10a and interior surface 10b. When positioned ideally the measurement object 10 is received centrally or symmetrically respectively within the measuring chamber 9 so that a center of the pipe D or, respectively, the axis of symmetry of the measurement object 10 falls on the axis of symmetry A. As show already in FIG. 4, however, the measurement object 10 will usually be positioned incorrectly so that the center of the pipe D or, respectively, center of the measurement object 10 does not coincide with the axis of symmetry A.

Thus, for one thing, the distance of the exterior surface 10a from the THz sensors 1 will be differing; however, this eccentricity as such is not problematic for layer thickness measuring because, subsequently the relative distances of the boundary surfaces of the pipe 10, i.e. the exterior surface 10a and interior surface 10b, will be measured anyway. However, the sensor axes B will also usually extend not perpendicular to the exterior surface 10a and the interior surface 10b so that, accordingly, it will not be possible to measure the exact layer thicknesses as perpendicular layer thicknesses or, respectively, shortest distances between the surfaces 10a, 10b by measuring along the sensor axes B, and, moreover, the reflected THz beams reflected at the exterior surface 10a and the interior surface 10b will not be reflected along the sensor axes B towards the THz sensors 1.

Therefore, the THz sensors 1 are each swiveled about individual correction angles α in the measuring plane 7 so as to be aligned perpendicular towards the exterior surface 10a. Hereby, it is recognized that, as a matter of principle, a calibration on a perpendicular path of the sensor axis B to the exterior surface 10a is sufficient, and, in particular, also in such measurement objects like a pipe 10, the interior surfaces 10b may exhibit changes of shape cause by various effects, such as e.g. curing or sagging respectively of the pipe material, which are non-ideal but nevertheless essentially to be determined.

Thus, according to the method for aligning the THz sensors 1, neither the pipe 10 nor the measuring apparatus 1 is adjusted, but merely the THz sensors 1 are swiveled about individual sensor correction angles α allowing for a THz measurement with sufficient accuracy.

According to FIG. 4, the THz sensors 1 are first divided into two sensor groups G1 and G2 allowing for a successive or, respectively, iterative correction of the individual groups. According to embodiment shown here, having eight THz sensors 1, the groups G1, G2 are formed by alternating division in circumferential direction; thus, in the first sensor group G1 the sensor S1 is at a starting position, hereinafter referred to as the 0° angular position in relation to the axis of symmetry A; further, the third sensor S3 is at an angular position of 90°, the fifth sensor S5 at an angular position of 180°, i.e. opposite the first sensor S1, and the seventh sensor S7 at an angular position of 270°, i.e. opposite the third sensor S3. The second sensor group G2 is formed by the other four THz sensors 1, i.e. the sensors S2, S4, S6 and S8 at the corresponding angular positions of 45°, 135°, 215°, and 315°.

In a first calibration adjustment step KS1 the first sensor group G1 serves as the starting group and the second sensor group G2 as adjustment group. Thus, in this starting position of FIG. 4, each THz sensor 1 of the first sensor group G1 will each, in its starting position in which its sensor axis B is aligned towards the axis of symmetry A, measure the starting distance d0 from the exterior surface 10a, i.e. starting distances d0-S1, d0-S3, d0-S5, d0-S7 are measured and stored. Thus, the so measured starting distance d0 defines for each THz sensor S1, S3, S5, S7 of the first sensor group G1 also a spacing point P1, P3, P5, P7 on the exterior surface 10a which is the result of the intersection point of its sensor axis B with the exterior surface 10a. Sincere, therefore, the sensor axes B—here, in the starting position, still extending radially—are known, it is possible to determine the positions or coordinates respectively of the spacing points P1, P3, P5, P7 on the basis of the known positions of the THz sensors S1, S3, S5, S7 of the first sensor group G1, their swivel axes B and the measured starting distances d0-S1, d0-S2, . . . d0-S7. For e.g. the first THz sensor S1 the first spacing point P1 results from the position of the first THz sensor S1 (on the measuring receptacle 6), the starting distance d0-S1 measured by it, and its sensor axis B_S1.

Generally, a measurement of the distance from the exterior surface 10a is possible even in the event of a minor positioning error because the reflected beam will still exhibit sufficient intensity or signal amplitude respectively even with such an incorrect position.

In the following, the sensor correction angles α of the THz sensors 1 of the second sensor group G2 are determined, i.e. the corrections in relation to initial orientation. Hereby, it is recognized that on the basis of a distance measurement of two not directly adjacent THz sensors 1, in particular a THz sensor and next but one THz sensor, the angular position of the THz sensor 1 lying in-between, may already provide for a correction representing a very good approximation of a perpendicular orientation. Such a correction is quite effective already, in particular in the case of a round exterior surface 10a, and will be further improved by an iterative course of action, in particular, successive repetition.

In particular in the embodiment shown here having eight THz sensors 1, a circular arc is formed between a first THz sensor S1 and a third THz sensor S3 or, generally, its next but one THz sensor 1, allowing for a highly precise positioning of the THz sensor 1 lying in-between, thus, in this case, of the second THz sensor S2, towards the exterior surface 10a.

To that end, according to an advantageous embodiment shown, in particular, in FIGS. 5, 6 and the diagram of FIG. 8, a straight base line L1 is drawn in the measuring plane 7 between two next but one sensors in relation to the THz sensors 1 of the first group G1, in this case, therefore, the first sensor S1 and the third sensor S3, preferably through the pivot points or, respectively, swivel axes C of the sensors S1 and S3. Further, a straight balance line L2 is drawn between the first spacing point P1 of the first sensor S1 and the third spacing point P3 of the third sensor S3. Now, on the basis of these lines L1, L2 and the position of the second sensor S2 its sensor correction angle α_S2 can be determined.

Thus, when a cylindrical pipe 10 is centrally aligned, as a matter of principle, the base line L1 and the balance line L2 are parallel; in case of deviations there will be an angle of intersection of the lines β between the lines L1, L2. The line intersection angle β is a direct indicator for the sensor correction angle α_S2, i.e. these angles α_S2, β may, in particular, be equated.

Hereby, the sensor correction angle α_S2 can be determined directly as a function, e.g. by means of pre-stored tables of the spacing points P1, P3 of the consecutive THz sensors S1, S3 of each sensor group.

Furthermore, a geometric determination is also possible, as can be seen from FIGS. 5, 7 and 8: Hereby, a line orthogonal L3 starting from the balance line L2 can be placed and this can be shifted or, respectively, positioned along the balance line L2 such that the line orthogonal L3 runs through the second sensor S2 or, respectively, its pivot point C, as shown in FIG. 8. Thus, this position will generally not lie centrally on the balance line L2. This orientation can be utilized directly as the new, corrected sensor axis B_S2 of the second sensor S2.

This concludes the determination of the angular correction of the second sensor S2 according to this procedure step. The sensor correction angles α_S4, α_S6 and α_S8 of the other THz sensors S4, S6 and S8 of the second sensor group S2 are each determined accordingly by a similar computation or, respectively, geometric layout of the respective adjacent THz sensors 1 of the first group G1. Thus, the sensor correction angle α_S4 is determined by means of the base line L1 between the third sensor S3 and the fifth sensor S5, as well as the corresponding balance line L2 of the spacing points P3 and P5 on the exterior surface 10a, and, similarly, the further sensor correction angles α_S6 and α_S8.

Subsequently, the THz sensors S2, S4, S6 and S8 of the second sensor group S2 are swiveled about their determined sensor correction angles α_S2, α_S4, α_S6 and α_S8.

Thus, following this correction, ideally, the THz sensors S2, S4, S6 and S8 of the second sensor group G2 are already aligned on the pipe center axis D or, respectively, the center point of the pipe 10. This is followed by the calibration adjustment of the sensors of the first sensor group G1 as adjustment group, in that the previously calibration adjusted THz sensors S2, S4, S6, S8 of the second sensor group G2 serves as starting group. Thus, distance measurements of the starting distances d0_S2, d0_S4, d0_S6 and d0_S8 are determined, and, derived from these, accordingly also the coordinates or vectors respectively of the spacing points P2, P4, P6 and P8 with the known corrected orientations of the sensor axes B_S2, B_S4, B_S6, B_S8. Then, in turn, from these spacing points P2, P4, P6 and P8 the balance lines L2 are determined, whereby the base lines L1 through the sensor positions are unchanged. Thus, it is possible to determine for each sensor of the first sensor group G1, always from L1 and L2, its sensor correction angle according to the above-described method.

Then, subsequently, the THz sensors S1, S3, S5 and S7 of the first sensor group G1 are swiveled accordingly about their sensor correction angles α_1, α_3, α_5, α_7.

It is apparent that, in particular in the case of a pipe 10 having a completely or essentially circular exterior surface 10a and relative minor displacement of its central axis D in relation to the axis of symmetry A, just a single cycle, i.e. two alternating calibrating steps, i.e. an adjustment of the THz sensors 1 of the second sensor group G2 and subsequent according adjustment and correction of the THz sensors 1 in sensor group G1, will be sufficient to attain a very good alignment. In the event of more significant displacements and, in particular, also with other than round exterior surfaces 10a, in particular, an iterative execution of this method may lead to successive further improvement. Thus, upon completion of one single execution of the procedure, a new correction procedure is carried out, wherein again initially, as described above, the THz sensors 1 of the second sensor group G2 are adjusted depending on the measurements of the THz sensors 1 of the first sensor group G1, etc.

In the embodiment shown here, eight THz sensors 1 are arranged on the circular measuring receptacle, i.e. the circular circumference U, so that a sensor and its next but one sensor are aligned with one another at 90° and, by virtue of this alone, the circular arc between them, in which the second sensor S2 is provided, is relatively small. In an embodiment having fewer THz sensors 1, e.g. even only four THz sensors 1, however, iterative repetition of the procedure, i.e. multiple cycles, are of particular advantage.

Hereby, it is apparent that such a swiveling adjustment can be carried out quickly and advantageously even compared to a translational adjustment of the entire pipe 10, or even the measuring receptacle 6 or, respectively, the entire THz measuring apparatus 1, because it is merely required to each pivot the THz sensor 1 about a small sensor correction angle α, with a low moment of inertia of the THz sensors 1. Hereby, the corrections of the THz sensors 1 of the second sensor group G2 and of the first sensor group G1 may each be carried out simultaneously so that two adjustment operations for the sensor groups G1, G2 are provided.

The calibration and, in particular, also computation of the sensor correction angle using the balance line L2 can also be carried out in the event of flattening or ovality, irrespective of whether the pipe is present in the measuring apparatus centrically or eccentrically. It is always possible to adjust the determined sensor correction angle α_S2 depending on the adjacent sensors S1, S3. This leads to sufficient accuracy while, owing to the geometric dependency of curvature and center of the sensor arrangement, a minor malposition will remain as a matter of principle. According to the invention, however, this is evaluated as negligible because the method of calibration allows for a quick and accurate determination and, generally, a direct and precise determination of a center point D is not possible in the case of a non-round eccentric measurement object 10. In particular, it is recognized according to the invention that the method of calibration is so exact that it is possible to measure the wall thickness. Moreover, the quick adjustment of the THz sensors 1 allows for a faster adaptation to malposition and deformation than e.g. translational adjustment of the THz measuring apparatus, further increasing the accuracy compared to e.g. slower translational adjustment in the case of a measurement object 10 guided through the measuring chamber 9 which, consequently, cannot be stopped during the adjustment.

In addition to the angular correction by the sensor correction angle α, it is possible with all embodiments to carry out an amplitude correction further reducing the angular malposition.

Upon completion of the calibration adjustment of the THz sensors 1 a fine adjustment can be carried out by pivoting the individual THz sensors 1, wherein these are adjusted, starting from their previously determined angular position, in both angular directions by small adjustment angles αv, and the non-adjusted measurement and the measurement including the two or more adjustment angles αv are compared to one another such that the position having the highest signal amplitude Sa_max is determined. Hereby, this measurement with the highest signal amplitude Sa_max generally represents the direct vertical or perpendicular respectively distance from the exterior surface. This fine adjustment by means of maximum value determination is also of advantage in the case of local and e.g. geometrically undefined flattenings and impurities.

Further, it is possible to additionally utilize the distance from the inner boundary surface, i.e. the interior surface 10b, for the fine adjustment. Thus, it is possible to determine, starting from the starting position, the distances d of each THz sensor 1 from the exterior surface 10a and the interior surface 10b, then execute the small adjustment angles αv and compare the signals for each THz sensor 1 to determine and adjust the vertical position. In principle, this fine adjustment can be carried out by small successive angular corrections until a perpendicular position is determined for each THz sensor 1, i.e. until a maximum is bounced back in the measurement signal.

The fine adjustment particularly complements the prior executed alternating calibration because the adjustment of the fine adjustment are merely small. Hereby, the angular position with the highest signal amplitude for each sensor may deviate from the von ideal perpendicular angular position referenced to the exterior surface 10a; hereby, however, these corrected angles allow for a best possible measuring of the wall thickness.

FIGS. 7a) and b) shows the measuring of a measured object 10 with a higher degree of or respectively a shape other than round, whereby, accordingly, there may also be a displacement of its central axis D in relation to the axis of symmetry A. Here, too, the method according to the invention can be carried out advantageously. Thus, e.g. the THz sensors 1 may be positioned with a deviation of 1.5° angular malposition, whereby an additional amplitude correction may reduce this to an angular malposition of almost 0°. Thus, FIG. 7a) corresponds to FIG. 6; FIG. 7b) shows, for better illustration, a simplification including only a few relevant lines. Hereby, for clarity, only the sensors S1, S2, S3 are provided with a few auxiliary lines. Thus, the two outermost sensors S3 and S1 lie in alignment with the axis of symmetry A, and, from the distances from the pipe 10 measured by them, the balance line L2 and there with the line intersection angle β to the base line is formed, which is, therefore, the advised correction angle for the sensor S2 in the middle.

Thus, the calibrating method according to the above-described embodiment may be represented according to FIG. 10 as including the following steps:
start in step St0,
step of providing St1 the THz measuring apparatus 8 including the pivoting THz sensor 1 arranged around the measuring chamber 9 alignment step St2 in the starting position,
group forming step St3 including allocating the THz sensors 1 to the two sensor groups G1, G2,
thereafter, the two at least two calibration adjustment steps KS1, KS2 following successively one after another, wherein always one of the sensor groups is the starting group and the other is the adjustment group, each including the following steps:
 St4-1 determining the spacing points on the exterior surface 10a, i.e., in the first calibration adjustment step KS1, of the first spacing points P1, P3, P5, P7,
 St4-2 determining the sensor correction angles α of the THz sensors of the adjustment group using the spacing points determined by the starting group, i.e. in the first calibration adjustment step KS1, of the sensor correction angles α of the THz sensors S2, S4, S6, S8, St4-3 adjusting the THz sensors (S2, S4, S6, S8) of the adjustment group by the determined sensor correction angles,
this calibration adjustment being executed at least 2 times for mutual successive adjustment of both groups G1, G2, possibly, however, 4 times or 6 times, . . . ,
and, preferably, subsequently the fine adjustment step St5 with maximum value determination Sa_max of the signal amplitude Sa by small adjustment angles αv of the individual THz sensors, independent of each other, is carried out.

FIG. 9 shows an arrangement 20 of a manufacturing device 21, e.g. an extruder, extruding and dispensing the pipe 10, where, accordingly, this pipe 10 made of plastics or rubber is still soft and therefore susceptible to bending and sagging thus varying and fluctuating its central axis D. The pipe 10 is guided by the guide means 20 through the THz measuring apparatus 8, with no translational adjustment of the THz measuring apparatus 8 being provided here but, rather, the above-described angular correction of the individual THz sensors 1. Here, advantageously, no adjustment of the pipe 10 by the guide means 22 is required.

Thus the pipe 10 can be measured after the calibration, in particular, the layer thickness d_10 as the distance between the exterior surface 10a and the interior surface 10b can be measured in the circumferential direction, moreover, the interior diameter ID of the pipe 10 from the various measuring directions. Thus, this measuring method can be carried out, in particular, in order to inspect the pipe 10 as measurement object for meeting required tolerance values following the extrusion.

LIST OF REFERENCE NUMERALS

1 THz sensor
2 sensor receptacle

3 THz chip
4 sensor lens
6 measuring receptacle
7 measuring plane
8 THz measuring apparatus
9 measuring chamber
10 measurement object, e.g. plastic pipe
10a exterior surface of the measurement object 10
10b interior surface of the measurement object 10
12 transmitted THz beam
14 reflected THz beam
20 arrangement
21 manufacturing device, extruder
22 guide means for guiding the pipe 10
25 adjustment device, e.g. electric micro motor
27 sensor module made of sensor 1, sensor receptacle 2,
28 wire
29 plug
30 controller means, e.g. as central controller means
A axis of symmetry of the THz measuring apparatus 8
B sensor axis of the THz sensor 1 or, respectively, the plurality of sensors S1 through S8
C swivel axis of the THz sensor in the sensor receptacle 2
D center point of the measurement object 10 or, respectively, its exterior surface 10a, e.g. axis of symmetry of the exterior surface 10a
d0 starting distance
G1 first sensor group
G2 second sensor group
L1 base line
L2 balance line
L3 line orthogonal on L2 through sensor of the other group
S1 bis S8 sensors in FIG. 6, 7a,b)
P1, . . . P8 spacing points
α sensor correction angle
β (L1, L2) line intersection angle
U circular circumference of the measuring receptacle 6
D central axis of the pipe 10
L3 line orthogonal
ID interior diameter
d_10 layer thickness

The invention claimed is:

1. A method for calibrating a THz measuring apparatus to a measurement object, the method comprising the steps of:
providing a THz measuring apparatus having a plurality of pivotable THz sensors, arranged in a circumferential direction around a measuring chamber, for putting out one transmitted THz beam each and receiving one reflected THz beam along a sensor axis,
orienting the plurality of pivotable THz sensors into a starting position in the measuring chamber, in which a measurement object is received,
allocating the plurality of pivotable THz sensors to at least one first sensor group and one second sensor group,
a first calibration adjustment step, in which the one second sensor group is adjusted as an adjustment group by means of the one first sensor group as a starting group,
a second calibration adjustment step, in which the one first sensor group is adjusted as an adjustment group by means of the adjusted one second sensor group as a starting group,
wherein in each of the first calibration adjustment step and the second calibration adjustment step:
by means of the starting group of the one first sensor group or the one second sensor group, spacing points on a surface of the measurement object are determined,
sensor correction angles of the adjustment group of the one first sensor group or the one second sensor group are determined by means of the spacing points determined by the starting group, and
the adjustment group of the one first sensor group or the one second sensor group is calibration adjusted about the determined sensor correction angles.

2. The method of claim 1, wherein the spacing points of the surface of the measurement object are determined in that a THz sensor of the starting group measures a starting distance from the surface of the measurement object and, from the measured starting distance and an orientation of a sensor axis, a spacing point included in the spacing points is determined as an intersection point of the sensor axis and the surface of the measurement object.

3. The method of claim 1, wherein THz sensors of the one first sensor group and of the one second sensor group are arranged alternatingly in the circumferential direction around the measuring chamber.

4. The method of claim 1, wherein, in the starting position in the measuring chamber, the plurality of pivotable THz sensors are arranged on a circular circumference of a measuring receptacle and/or aligned centrally or radially to a common axis of symmetry or a center point of the THz measuring apparatus in the starting position in the measuring chamber.

5. The method of claim 1, wherein a sensor correction angle, included in the sensor correction angles, of a THz sensor of the adjustment group is determined by means of two adjacent THz sensors of the starting group.

6. The method of claim 5, wherein upon determining the sensor correction angle of the THz sensor of the adjustment group, by means of two determined spacing points of the two adjacent THz sensors of the starting group, a balance line is laid, and a base line is laid through sensor positions of the two adjacent THz sensors of the starting group, and, from a relative position of the base line and the balance line, the sensor correction angle of the THz sensor of the adjustment group lying in-between is determined.

7. The method of claim 6, wherein the sensor correction angle of the THz sensor of the adjustment group is determined depending on an intersection angle between the base line and the balance line.

8. The method of claim 6, wherein the sensor correction angle of the THz sensor of the adjustment group is determined by forming an orthogonal line, which is perpendicular to the balance line and runs through a sensor position of the THz sensor of the adjustment group of the one first sensor group or the one second sensor group lying in-between, where the orthogonal line is taken as a corrected sensor axis of the THz sensor of the adjustment group lying in-between.

9. The method of claim 1, wherein following the first calibration adjustment step and the second calibration adjustment step, the first calibration adjustment step and the second calibration adjustment step are iteratively repeated at least once.

10. The method of claim 1, wherein in a subsequent fine adjustment step:
each THz sensor of the plurality of pivotable THz sensors is pivoted about its swivel axis starting from its current pivot position, each THz sensor, in its current pivot position and in comparative pivot positions generated by swiveling in both pivoting directions, each outputting a transmitted THz beam, a signal amplitude of a reflected THz beam reflected from the surface of the measurement object is measured in each of the comparative pivot positions, signal amplitudes of measurements are compared, and a measurement of a fine-adjusted position having a maximum signal amplitude is determined and set by adjusting each THz sensor.

11. The method of claim 1, wherein the THz measuring apparatus and/or the measurement object are not translationally adjusted in a measuring plane relative to one another.

12. The method of claim 1, wherein each of the plurality of pivotable THz sensors is adjusted in that each of the plurality of pivotable THz sensors is swiveled about a fixed swivel axis arranged on a circumferential line.

13. The method of claim 1, wherein each of the plurality of pivotable THz sensors puts out a transmitted THz beam in a frequency range between 5 GHz and 50 THz as a lower frequency value and 3 THz, 5 THz, or 10 THz as an upper frequency value by means of a time of flight measurement, a frequency modulation, or pulsed radiation.

14. A THz measuring method for measuring a measurement object, comprising:

calibrating a THz measuring apparatus to a measuring object, according to the method of claim 1, for attaining a perpendicular orientation towards an exterior surface of the measurement object, and following a calibration, wherein the plurality of pivotable THz sensors measure layer thicknesses of the measurement object at several positions, each THz sensor of the plurality of pivotable THz sensors by emitting a transmitted THz beam and receiving reflected beams reflected at boundary surfaces of the measurement object.

15. The THz measuring method of claim 14, wherein the measurement object is guided continuously through the THz measuring apparatus along a direction of transport along its central axis and/or an axis of symmetry of the THz measuring apparatus so as to measure a full perimeter of the measurement object.

16. A THz measuring apparatus, comprising:
a measuring receptacle,
a measuring chamber for receiving a measurement object,
adjustment devices,
a plurality of THz sensors received at the measuring receptacle for outputting each a transmitted THz beam, receiving a reflected THz beam and outputting a signal amplitude for a measurement of times, flight, and/or distances, each of the plurality of THz sensors being pivotable on the measuring receptacle by the adjustment devices and, in a starting position, oriented towards the measuring chamber provided between the plurality of THz sensors, and a central or peripheral controller means for receiving signal amplitudes of the plurality of THz sensors and controlling the adjustment devices for swiveling the plurality of THz sensors, the central or peripheral controller means being designed or adapted for carrying out the method of claim 1.

17. The THz measuring apparatus of claim 16, wherein the plurality of THz sensors are arranged in a measuring plane, their sensor axes run in the measuring plane, and their swivel axes are perpendicular to the measuring plane for an adjustment in the measuring plane without any further translational or rotational adjustability.

18. The THz measuring apparatus of claim 16, further comprising:
a sensor module, wherein each of the plurality of THz sensors is received in the sensor module,
a sensor receptacle,
the adjustment devices for swiveling the plurality of THz sensors inside the sensor receptacle, and
a contacting device for electrically contacting the sensor module in the measuring receptacle, the sensor module in the measuring receptacle being replaceable during an operation of the THz measuring apparatus.

19. An arrangement consisting of:
a manufacturing device for manufacturing a one or multi-layer pipe, the THz measuring apparatus according to claim 16, for continuously measuring
the one or multi-layer pipe in a measuring plane, and a transport device for transporting the one or multi-layer pipe along an axis of symmetry through the THz measuring apparatus.

20. An arrangement comprising:
a manufacturing device for manufacturing a one or multi-layer pipe,
the THz measuring apparatus according to claim 16, for continuously measuring the one or multi-layer pipe in a measuring plane, and
a transport device for transporting the one or multi-layer pipe along an axis of symmetry through the THz measuring apparatus.

* * * * *